US007596481B2

(12) United States Patent
Zamora et al.

(10) Patent No.: US 7,596,481 B2
(45) Date of Patent: *Sep. 29, 2009

(54) THREE-DIMENSIONAL WELLBORE ANALYSIS AND VISUALIZATION

(75) Inventors: Mario Zamora, Houston, TX (US); Douglas Simpkins, Cypress, TX (US)

(73) Assignee: M-I L.L.C., Houston, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 11/473,778

(22) Filed: Jun. 23, 2006

(65) Prior Publication Data

US 2006/0293872 A1 Dec. 28, 2006

Related U.S. Application Data

(63) Continuation-in-part of application No. 11/083,122, filed on Mar. 13, 2005, which is a continuation of application No. 11/063,913, filed on Feb. 23, 2005.

(60) Provisional application No. 60/553,486, filed on Mar. 16, 2004.

(51) Int. Cl.
*G06G 7/48* (2006.01)
*G01V 1/00* (2006.01)
*G01V 1/40* (2006.01)

(52) U.S. Cl. ................................ 703/10; 702/6; 702/18

(58) Field of Classification Search .................. 703/10; 702/6, 16, 18, 150, 152, 153
See application file for complete search history.

(56) References Cited

U.S. PATENT DOCUMENTS 4,973,960 A 11/1990 Mount, II
6,078,867 A * 6/2000 Plumb et al. .................. 702/6
6,106,561 A 8/2000 Farmer
6,282,452 B1 8/2001 DeGuzman et al.

(Continued)

OTHER PUBLICATIONS

Odegard et al.; "Future Drilling and Well Activities are Globally Integrated Using Realtime 3D Visualization;" Offshore Mediterranean Conference and Exhibition; Rabenna Itally; Mar. 16-18, 2005.

(Continued)

*Primary Examiner*—Paul L Rodriguez
*Assistant Examiner*—Andre Pierre Louis
(74) *Attorney, Agent, or Firm*—Wong, Cabello, Lutsch, Rutherford & Brucculeri LLP

(57) ABSTRACT

A visualization system for a wellbore environment includes a graphics processor for creating a computer rendered visual model of a well, and optionally a drill string, based on data sets of depth-varying and/or time-varying parameters of the well. The model is then displayed on a graphics display. A user interface facilitates user navigation along the length of the well to any selected region therein, and further permits user adjustment of orientation of the displayed renderings as well as a temporal selection of the time-varying data to be displayed. Simulated, real, or a combination of simulated and real wellbore data, which may be steady state, transient, or real-time data, may be visually depicted at any selected region. This provides the user with a visual indication of the wellbore environment as the user navigates the visualization spatially and temporally.

20 Claims, 20 Drawing Sheets
(15 of 20 Drawing Sheet(s) Filed in Color)

U.S. PATENT DOCUMENTS

| | | | | |
|---|---|---|---|---|
| 6,313,837 | B1 | 11/2001 | Assa et al. | |
| 6,665,117 | B2 | 12/2003 | Neff et al. | |
| 6,801,197 | B2 | 10/2004 | Sanstrom | |
| 6,826,483 | B1 * | 11/2004 | Anderson et al. | 702/13 |
| 6,862,530 | B2 | 3/2005 | Fleury et al. | |
| 6,873,947 | B1 * | 3/2005 | Huang et al. | 703/10 |
| 6,917,360 | B2 | 7/2005 | Terentyev et al. | |
| 6,941,255 | B2 * | 9/2005 | Kennon et al. | 703/10 |
| 6,997,256 | B2 * | 2/2006 | Williams et al. | 166/250.03 |
| 2005/0015229 | A1 * | 1/2005 | Huang | 703/10 |
| 2005/0096847 | A1 * | 5/2005 | Huang | 702/9 |
| 2005/0209866 | A1 * | 9/2005 | Veeningen et al. | 705/1 |
| 2006/0076163 | A1 * | 4/2006 | Terracina et al. | 175/393 |

OTHER PUBLICATIONS

MOM Demonstration of e-Drilling 3D Visualization Prototype; minutes of meeting; Stavanger, Norway; Jan. 1, 2006.

Bjorkevoll et al.; "Successful Field of Use of Advanced Dynamic Models;" IADC/SPE Drilling Conference; Miama, FL; Feb. 21-23, 2006.

Virtual Well Engineer Ltd.; "Desk Top Visualization for the Well Engineer;" Product overview found at www.virtualwellengineer.co.uk.

Zamora et al.; "Advances in 3D Wellbore Visualization and Their Impact on Drilling and Completion Optimization;" AADE 2006 Fluids Conference; Houston, TX; Apr. 11-12, 2006.

Zamora et al.; "Development and Application of a 3D-Wellbore Visualization system for Hydraulics Analyses;" SPE/IADC Drilling Conference; Amsterdam, The Netherlands; Feb. 23-25, 2005.

"Halliburton Baroid Fluid Services—DFG DrillAhead Hydraulics;" Upstream CIO; Nov. 2005.

Roy, et al.; "AADE-02-DFWM-HO-37: Using Real-Time Hydraulics Modeling to Complement Annular-Pressure-While-Drilling Data;" AADE 2002 Technology Conference "Drilling & Completion Fluids and Waste Management," Houston, Texas Apr. 2-3, 2002.

Zamora, et al.; "AADE-02-DFWM-HO-13: Making a Case for AADE Hydraulics and the Unified Rheological Model;" AADE 2002 Technology Conference "Drilling & Completion Fluids and Waste Management;" Houston, Texas Apr. 2-3, 2002.

* cited by examiner

THREE-DIMENSIONAL WELLBORE ANALYSIS AND VISUALIZATION

CROSS-REFERENCE TO RELATED APPLICATIONS

This application is a continuation-in-part of U.S. patent application Ser. No. 11/083,122, entitled, "Three-Dimensional Wellbore Visualization System for Drilling and Completion Data," filed Mar. 16, 2005, which is a continuation of U.S. patent application Ser. No. 11/063,913, entitled "Three-Dimensional Wellbore Visualization System for Hydraulics Analysis," filed Feb. 23, 2005, both of which claim priority to U.S. Provisional Patent Application 60/553,486. The contents of each of the foregoing are incorporated by reference herein.

STATEMENT PURSUANT TO 37 C.F.R. § 1.84(2)(iv)

The patent or application file contains at least one drawing executed in color. Copies of this patent or patent application publication with color drawings will be provided by the Office upon request and payment of the necessary fee.

BACKGROUND

Those of ordinary skill in the art will appreciate that the oil industry often uses three-dimensional (3D) visualization to showcase its exploitation of the latest high-tech developments. (As used herein, the term "visualization" is intended to encompass a process involving the computer processing, transformation, and visual/graphical display of measured or simulated data to facilitate its interpretation.) Visualization has become a well-established planning and analytical tool for the geological and geophysical (G&G) segment of the industry. Benefits extend beyond technical issues, as communal visualization has promoted multi-disciplinary discussion and created opportunities to bring people together and improve the dynamics of exploration and production (E&P) teams by providing clarity in the face of the ever-increasing amount of data that forms the modem well construction process.

Similar success is being achieved in drilling. Early applications focused on well placement in complex reservoirs, and directional drilling to control well tortuosity and avoid collisions on multi-well platforms. More recent applications use 3D visualization to address drilling problems and link drilling operational data to earth models. Countless other drilling prospects should exist, especially considering that "making hole" occurs out of sight, miles below the earth's surface.

One reason that this visualization of the wellbore and vicinity around the wellbore is important is that the operator can immediately see the impact that certain changes have on other wellbore parameters. For example, if one parameter is adjusted from the surface or if a different fluid is added to the wellbore, the operator can see if that change has affected the hydraulics within the wellbore as well as the magnitude of the resulting effect on the hydraulic parameters within the wellbore. It certainly is possible that in the not-too-distant future, a driller controlling the brake with a joystick could use a different joystick to visually navigate to places in the well where a powerful computer has simulated an existing or pending drilling problem In the prior art, downhole visualization has focused principally on the trajectory of the borehole, particularly with the ever-increasing popularity of directional drilling. Knowing the precise location of the borehole at all points along its length is critical to ensure that the drilling operation succeeds ultimately in the borehole arriving at the desired production region.

Downhole video is a proven telepositioning method for mechanical inspection, fishing operations, and problem investigation in a wellbore. Unfortunately, downhole video cannot be used during drilling, because (a) nearly all drilling fluids are opaque; (b) normal drilling operations would have to be suspended; and (c) the drill string would interfere with camera operations.

Videos taken of simulated wellbores in the laboratory, despite temperature and pressure shortcomings, have contributed significantly to the industry's understanding of downhole behavior, especially hole cleaning and barite sag. Remarkable footage captured through transparent, inclined flow loops have documented the impact of different parameters on hole-cleaning efficiency, including hole angle, annular velocity, pipe eccentricity and rotation, low-shear-rate viscosity, flow regime, and avalanching cuttings beds. Video has also helped validate the field success with drilling horizontal wells at some sites with Theologically engineered bio-polymer drill-in fluids, a hole-cleaning concept that was contrary to industry thinking at the time. Additionally, laboratory studies based on extensive video imaging helped convince the industry that barite sag was primarily a dynamic settling problem and not the static problem as previously thought.

Nevertheless, video examination of actual wellbores is not a practical alternative, meaning that other means must be employed to analyze dynamic parameters of the interior of a wellbore.

Outside of the oil industry, video has long been a mainstay to view objects not easily accessible. The medical field is perhaps the best known, and the colonoscopy is an excellent analogy to downhole video technology. Recent technological advancements have made it possible to perform a non-invasive procedure called a "virtual" colonoscopy. The virtual colonoscopy process involves performing a spiral (or helical) computer-aided tomography (CAT) scan, wherein a rotating x-ray machine follows a spiral path around the body. A high-powered computer uses the x-ray data to create detailed cross-sectional pictures of the body. The high-resolution, 2D pictures are then assembled like slices in a loaf of bread to construct a detailed, 3D image of the colon lining suitable for thorough analysis by the doctor.

Virtual images created for medical use invariably are based on measured data. Unfortunately, detailed data required along a well path cannot be measured with current technology. The alternative is to simulate the downhole drilling process with appropriate models for critical information that is not yet measured. Logically, the accuracy of the models is important.

To address this problem, computer applications have been developed for simulating the internal environmental dynamics within wellbores based on measured or modeled data about the well. Advanced software has emerged that considers, among other things, the effects of temperature and pressure on density and rheology of the drilling fluid. Numerous commercially-available examples of such analysis applications are known in the art. An interesting aspect of such programs is that the modules created for calculating equivalent static densities (ESDs), for example, are based on numerical integration of short wellbore segments. This approach has set the stage for using techniques involving finite difference analysis for other calculations. Generally speaking, hydraulics applications function to take a number of dynamic, depth-varying parameters for a wellbore (and drill string) as inputs to provide as output one or more indicators of well performance and behavior. Additionally, hydraulics applications that incorporate time-varying parameters for a wellbore are also available. These time varying parameters may take the form of transient data, representing the evolution of well parameters over time, or real-time data, which includes measured well parameters, as the name suggests, in real time.

Accuracy is a serious issue regarding downhole simulation. Oftentimes, measured data or a combination of simulated and measured data can be used to understand the internal environmental dynamics in the wellbore environment. Currently much of these data are presented in traditional two dimensional graphs or in data tables. However, in many cases, large data sets make this cumbersome or mentally impossible. This difficulty is compounded greatly when moving from steady state data to transient and real-time data. Thus there remains an on-going need for methods of viewing and analyzing depth-varying and/or time-varying data sets in a visually appealing manner.

SUMMARY

Disclosed herein are innovative computer-based methods and systems for exploiting additional drilling visualization opportunities.

In accordance with one aspect of the invention, systems and methods are provided for permitting interactive 3D visualization of the wellbore environment. As used herein, "wellbore" and "wellbore environment" may include not just the actual borehole, but also the near wellbore region, i.e., the borehole and a portion of the formation adjacent the borehole, as well as the drill string, accumulated drill cuttings, filter cake beds, and fluid flow. This interactive 3D visualization is a more natural and intuitive view for most drillers, whether on the drilling rig floor or in a remote office. Measured and/or simulated downhole conditions can be critically examined while navigating the well spatially from surface to total depth (TD) and temporally from beginning to end of various operations using a standard personal computer and a joystick, mouse, game pad, or other user input device. This capability is useful for interpreting large data sets, mitigating drilling problems, training, and maximizing collaboration among multi-disciplinary teams and some drilling teams separated by a common language. It also places downhole modeling under the microscope and helped highlight important areas where renewed effort is required.

In one embodiment, the wellbore visualization focuses on drilling fluid hydraulics and the environmental dynamics related to fluid flow in the wellbore, important topics selected for several reasons, including the following:

- Hydraulics is a critical issue on all wells, especially deepwater, HTHP, and extended reach well construction projects.
- Hydraulics is central to most common downhole problems and solutions.
- Flow loop videos on hole cleaning and barite sag suggest hydraulics interactions, but downhole fluid behavior has been left to individual imaginations.
- Step improvements in simulation software have been realized in recent years.
- Results from some advanced hydraulics programs are already in a format compatible with current 3D graphics engines.
- Many hydraulic parameters are highly visual and lend themselves to 3D visualization.

In accordance with another aspect of the invention, a system is provided which includes a graphics engine and simulation models. Optionally, measured data sets may also be utilized or combined with the simulated data. These data sets may include not only steady state data, but also transient data and/or real-time data. The graphics engine uses 3D perspective rendering and programming techniques similar to those employed in common computer gaming applications to convert these data sets to a visually perceptible rendering. This approach makes it possible to run high-quality, interactive graphics on conventional "personal" class computers (PCs). The finite difference method used by the hydraulics program makes it possible to borrow an innovative concept from the medical field to integrate the modeled data, optional measured data, and the graphics and visualization aspects described herein.

Additional details and information regarding the disclosed subject matter can be found in the following description and drawings.

DETAILED DESCRIPTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and sub goals (e.g., compliance with system and technical constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the relevant fields.

Furthermore, for the purposes of the present disclosure, the terms "comprise" and "comprising" shall be interpreted in an inclusive, non-limiting sense, recognizing that an element or method step said to "comprise" one or more specific components may include additional components.

In this description, the terms "up" and "down"; "upward" and "downward"; "upstream" and "downstream"; and other like terms indicating relative positions above or below a given point or element may be used to clearly describe some embodiments of the invention. However, when applied to apparatus and methods for use in wells that are deviated or horizontal, such terms may refer to a left-to-right, right-to-left, or other relationship as appropriate.

In accordance with one embodiment of the invention, the drill string and annulus (borehole) are subdivided into segments of predetermined length, preferably 50 to 100-ft cells or segments for simulation purposes. The selection of the segment size will be dependent on any number of factors well known to one of skill in the art including desired resolution and precision of the data, computing power, available memory, processing time and speed requirements, and so forth. Each cell is assigned certain key parameter values such as rheological properties, temperature, pressure, density, eccentricity, inclination, azimuth, geometry, velocity profile, cuttings bed depth, formation lithology, etc. The cells are like the slices in the loaf of bread analogy previously used to describe the virtual colonoscopy. At each depth into the borehole, the aforementioned and perhaps other depth-varying parameters are specified. Additionally, each cell may be assigned different values for certain parameters as a function of time. As described in greater detail below, this permits time varying parameters, such as temperature, pressure, etc. to be added to the visualization, adding a time dimension to the spatial dimensions. This time-varying information may be used for transient visualization, i.e. viewing of parameter evolution over time, or for real-time visualization, i.e., visualization of wellbore conditions as they happen.

Figure 1:
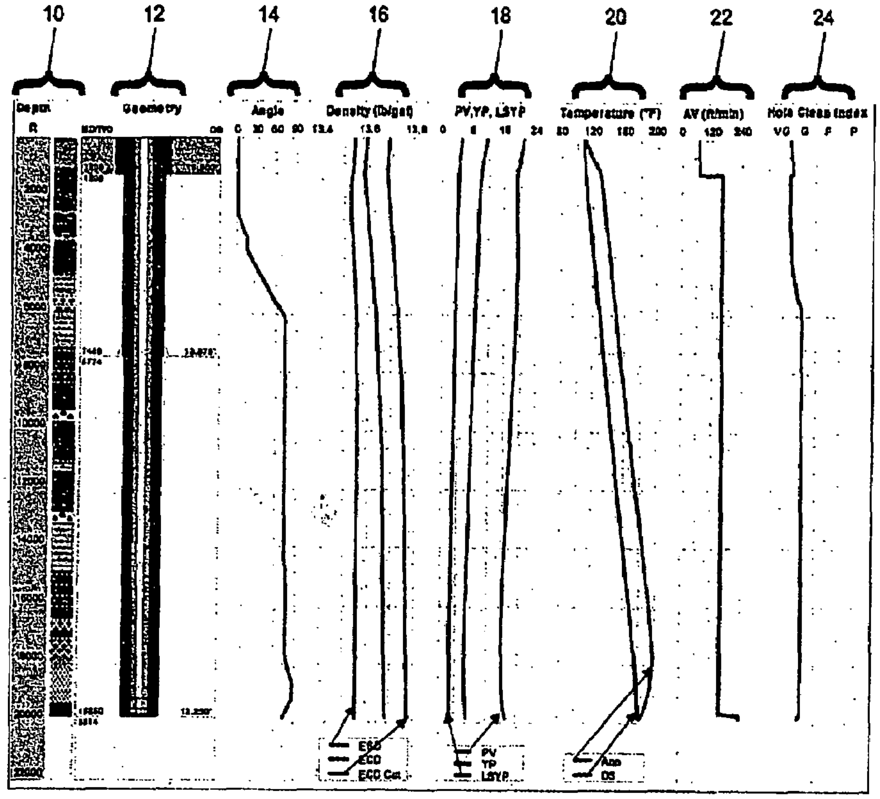
FIG. 1 is a plot of well data including a plurality of different well parameter data sets.

Turning to FIG. 1, there is shown a graphical output of well data plotted versus well depth. As shown in FIG. 1, the well data comprise a plurality of data sets each corresponding to a particular depth-varying parameter of a well. In one embodiment, the plots are profile snapshots of the parameter values from surface to total depth at a point in time. However, those of ordinary skill in the art having the benefit of the present disclosure will appreciate that the invention may be implemented in such a manner as to allow for the receipt of real-time data during an actual drilling operation, which would lead to ongoing changes in the resultant data visualization.

Much data is presented in the plots of FIG. 1, including: a schematic representation of borehole/drill string geometry 12; the borehole angle 14; equivalent static and circulating densities 16; plastic viscosity, yield point, and low shear rate yield point (LSYP) 18; annulus and drill string temperature 20; annular fluid velocity 22; and a quantification of hole quality referred to as a "Hole Clean Index" 24. The Hole Clean Index is computed based on the calculated accumulation of drilled solids in the wellbore. Despite the large amount of information represented by the plots in FIG. 1, the presentation of this data in the format of FIG. 1 is believed to be less than optimal in conveying to the drilling operator an accurate overall sense of the drilling operation and conditions. The goal of visualization as described herein is to transform these profiles into navigable 3D renderings that provide the user a more comprehensive understanding of the overall drilling operation.

One of skill in the art should appreciate that while the above description has utilized simulated or modeled data in the visualization, real-time or measured data sets may also be utilized. As described herein such data may be displayed alone or in combination with the simulation data. In this way a virtual reality wellbore can be visualized that is at least partially based on the actual reality of the wellbore and downhole environment.

As previously noted, the visualization system may preferably be implemented on a computer such as those commonly referred to and nearly universally recognized as "personal computers," including at least one microprocessor, memory, display device(s), user input device(s), and so on, as would be familiar to those of ordinary skill in the art. The data displayed in FIG. 1 are shared with a graphics engine application executed by the computer system in the form of matrices (data arrays) stored in global shared memory, a technique that can prove useful for real-time applications as described further below. To enhance continuity and improve resolution, the 100-ft segments commonly used by hydraulics simulation programs may preferably be further subdivided into shorter cells for the graphics engine.

The selection of a particular graphics engine is not believed to be relevant for the purposes of the present invention. Those of ordinary skill in the art will be familiar with numerous commercially-available graphics applications suitable to perform the graphics processing described herein. Preferably, the graphics application(s) used to practice the invention as described herein is sufficiently optimized to be compatible with the processing capabilities of the computer system used in a given implementation of the invention. That is, a more sophisticated, higher-resolution graphics system may require correspondingly greater processing power in the computer, as would be apparent to those of ordinary skill in the art.

Figure 11:
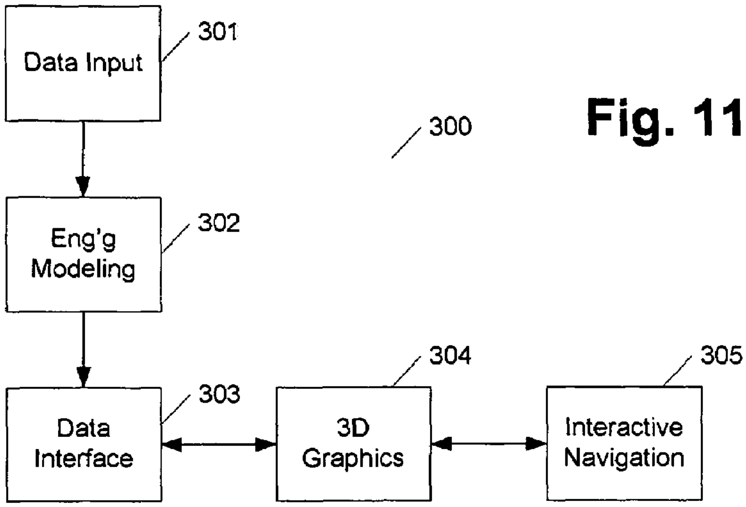
FIG. 11 is a simplified schematic diagram of a visualization system.

A simplified schematic diagram of a visualization system 300 incorporating various aspects of this disclosure is depicted in FIG. 11. Principal components include data input module 301, engineering modeling module 302, data interface module 303, 3D graphics module 304, and interactive navigation module 305. Exact details of the responsibilities and interaction among the five components depend on the particular application.

Data input module 301 accepts data from different sources and transfers them to the engineering modeling modules 302. Data manually input via the keyboard are the norm for planning and typical analysis sessions involving steady state, semi-steady state, and simulated transient engineering models. Alternatively, the data may be read from a file located on a local or network accessible storage device. Real-time applications may also receive continuous, measured data provided electronically by surface and downhole sensors, which may be directly interfaced to the computer or may be accessible via a network. Various possibilities and embodiments of the various configurations will occur to those skilled in the art, and as such will not be discussed in detail herein.

In most cases, input data are subsequently processed by the engineering modeling component 302 to yield desired results. It will be appreciated that although the engineering modeling component 302 is depicted as a single module, in fact, many different engineering modeling modules may be connected to perform calculations, analyses and simulations on the input data, either sequentially or in parallel. Moreover, in real-time applications it may be desirable to have measured input data pass directly from data input module 301 to 3D graphics component 304 with no or minimal manipulation.

The primary responsibility of engineering modeling module 302 is to define the downhole wellbore, using appropriate engineering models and data sets whenever direct measurements are either unavailable or impractical. Different model types include predefined (such as for downhole tools), steady state, and transient. Steady state models typically produce static results, while transient models used for look-ahead/reconnaissance and real-time applications can continually display intermediate values using a variety of dynamic and animated objects. Additionally, the transient models may be used in conjunction with real-time data to extrapolate and/or interpolate the real-time data to further enhance the user experience.

An additional responsibility of engineering modeling component 302 is to ensure that each object that is to be graphically represented is properly characterized with regard to data and associated structure. It is fortuitous that the finite difference method used by much of the existing engineering software on which engineering modeling component 302 may be based creates a suitable underlying structure defined around wellbore segments that can be further divided as necessary for increased graphical resolution.

Data interface 303 accepts engineering data sets output by engineering modeling component 303 and transfers them to 3D graphics module 304 in a format suitable for rendering. The exact nature of the data conversion will depend on the output format of the particular engineering modeling component 302 and the particular input format required by 3D graphics component 304. Nonetheless, implementation of such data conversions would be a routine undertaking for one skilled in the computer programming and/or computer graphics arts, and thus details will not be recited herein.

Communication between the engineering modeling component 302 and 3D graphics module 304, as facilitated by data interface module 303 can be a one-time occurrence, as in the case of fixed and steady-state data, or may be a continuous transfer for transient engineering data or real-time data (assuming the real-time data does not entirely bypass engineering modeling module 302 and data interface module 303 as suggested above). In the case of continuous transfer, the data exchange preferably takes place at a frequency corresponding to key changes in input, measured, calculated, and/or image data. Specifically, the data exchange should be sufficiently frequent to provide the necessary degree of meaningful data for the visualization, while not being so frequent as to overwhelm the processing capability of the system.

Two primary methods, shared memory and file streams, may be used together or separately to implement the data sharing accomplished by data interface 303. For shared memory, the operating system allocates a portion of computer memory that multiple, threaded processes can alternate access and transfer of large amounts of data at very high speeds. As an example, a shared memory space may be allocated that is shared among a particular modeling software package (engineering modeling component 302), a translation program (data interface 303), and 3D graphics module 304. Once the modeling software outputs the results of a particular operation or simulation into the shared memory, the data is converted, as necessary, by the translation program. 3D graphics module 304 may then access this data for further processing and rendering, as described in greater detail below.

Alternatively, for file streams, the data are stored, again, in a way that it may be accessed by multiple processes. The basic logistics of shared memory and file streams are the same. Output data from engineering modeling module 302 is output, translated, if necessary, by the data interface module 303, and input into 3D graphics module 304 for further processing and rendering. It should be noted that file streams are particularly suited to real-time applications involving network traffic, such as those in onshore drilling centers, because of the multiple computers involved. As will be further appreciated by those skilled in the art, there are other differences between shared memory and file streams in terms of storage requirements (generally higher storage requirements will be better served by file streams), integrity (generally systems based on file streams will be more stable than those based on shared memory), and complexity of a particular arrangement.

3D graphics component 304 generates and displays graphic images on the computer screen, as described in greater detail below. It is should be noted that 3D graphics component 304 is highly dynamic, regardless of whether the underlying engineering application is static, steady state, transient, or real time. Generally, static and steady state data are easier to represent then transient data, because static and steady state data can be created in one frame and rendered repeatedly without requiring work by the graphics engine. Transient data, however, require the graphics engine to smoothly update old data to the new state over a set time period.

Interactive navigation component 305 accepts commands from the user via a user input device, such as a keyboard, joystick, mouse, game pad, etc. to manipulate the virtual downhole camera so that the user may view different regions along the length of the wellbore. Context sensitive action mapping synchronizes the input device and camera movements (including down, up, side-to-side, and telescoping) during internal and side projections. Internal projections simulate the downhole video and colonoscopy examples mentioned previously. Side projections provide a perspective that especially illustrates the skewed aspect ratios involved in well construction. Combined navigation along the well path, zoom, and complete rotation provide maximum ability to critically examine the virtual wellbore in this mode.

A system as described above operating on static or steady state data may be designed to run on a single desktop or laptop computer. This will generally require that data input and engineering modeling be completed first, with the results then passed to the graphics and navigation components through the data interface. However, in the case of real-time and network environments, all components will need to be concurrently active, i.e., engineering modeling component 302 will be operating on a new data set while 3D graphics module 304 is displaying a previous data set and/or while a previous data set is being navigated by the user. Depending on the complexity of the models and or visual renderings to be performed, this may also be performed on a single PC class computer, but, as will be appreciated, at some point the computational requirements may become so great that it may be advantageous to perform heavy engineering calculations and graphics processing on separate computers.

Figure 12:
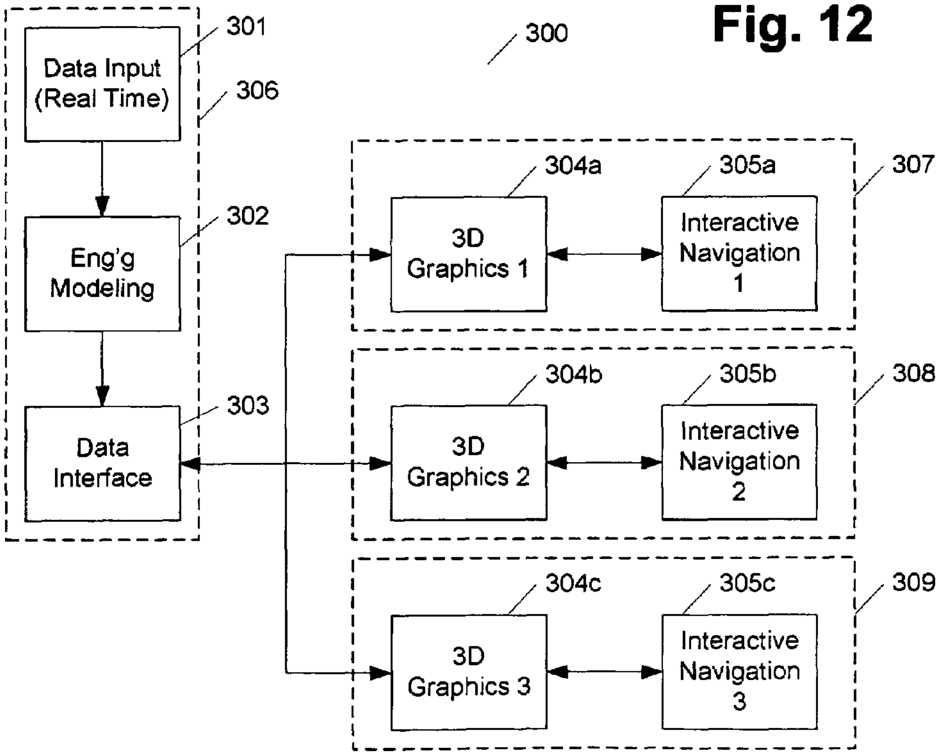
FIG. 12 is a simplified schematic diagram of a visualization system incorporating multiple computers.

Thus, real-time and network configurations may preferably be designed to separate the engineering modeling and graphics processes. The flow diagram of FIG. 12 illustrates how three graphics stations 307, 308, and 309 could be supported by a single engineering computer or network server 301. The engineering computer or network server 306 would run the data input module 301, the engineering modeling module 303, and the data interface module 303. Separate instances of 3D graphics module 304*a*, 304*b*, 304*c* and interactive navigation module 305*a*, 305*b*, and 305*c*, are running on the graphics stations 307, 308, and 309 respectively. The same data provided concurrently could thus be visualized differently at each of the three stations, providing great benefits to physically dispersed working teams. Moreover, this approach allows the graphics stations to be widely separated from the engineering computer or network server 301, as this approach could be implemented over a local area network (LAN), wide area network (WAN), or the Internet. Of course, it will be appreciated that some delays and interruptions could be expected depending on communications quality, particularly over WAN and Internet links.

An additional variation on this theme (not shown) would allow multiple engineering computers or servers 306, each running one or more of the engineering modeling software packages. Again, a variety of network topologies, easily configured by those skilled in the computer networking arts, could be adapted to provide a particular combination of features at a desired number of locations to facilitate visualization of the complex engineering data.

Figure 2:
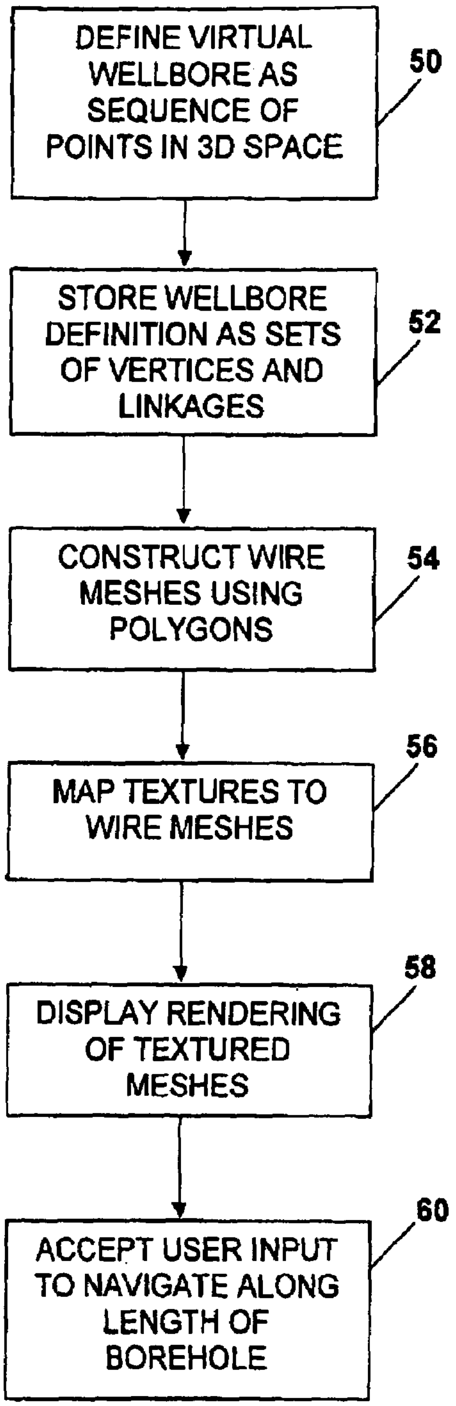
FIG. 2 is a flow diagram of a well data visualization process in accordance with one embodiment of the invention.

An exemplary embodiment of a visualization system will now be described. Although the particular example is primarily directed to visualization of static and/or steady state data, as noted throughout the example, the principles discussed are equally applicable to transient and/or real-time data, and further description below will explain the extension of these concepts to the transient and/or real-time cases. FIG. 2 is a flow diagram showing a visualization process in accordance with this example. Using the available data that are displayed in FIG. 1, defining the well survey as a sequence of points in 3D space is the first step in creating the virtual wellbore, as represented by block 50 in FIG. 2. Next, a vertex list, i.e., a collection of points in the 3D space, and the index buffer, i.e., linkages between the vertices, are preferably stored in graphics memory for quick and efficient recall. This is represented by block 52 in FIG. 2.

Next, the graphics engine mathematically delineates meshes, also commonly referred to as "wire frames," at each point along the path based on the vertex list and linkages, as represented by block 54. The meshes are the surfaces on which textures later will be mapped, as would be understood by those of ordinary skill in the art. In accordance with conventional graphics processing and rendering techniques, each mesh (equivalent to data cells from the hydraulics program) is constructed using an array of polygons, preferably triangles, which are, of course, the simplest polygons.

Those of ordinary skill in the art of computer graphics will appreciate that the prior art is replete with methods and systems for creating wire frame or wire mesh computer models of three-dimensional objects and surfaces, and describing particular details of a process of defining the virtual wellbore model is not believed to be necessary for the purposes of the present disclosure.

Figure 3A:
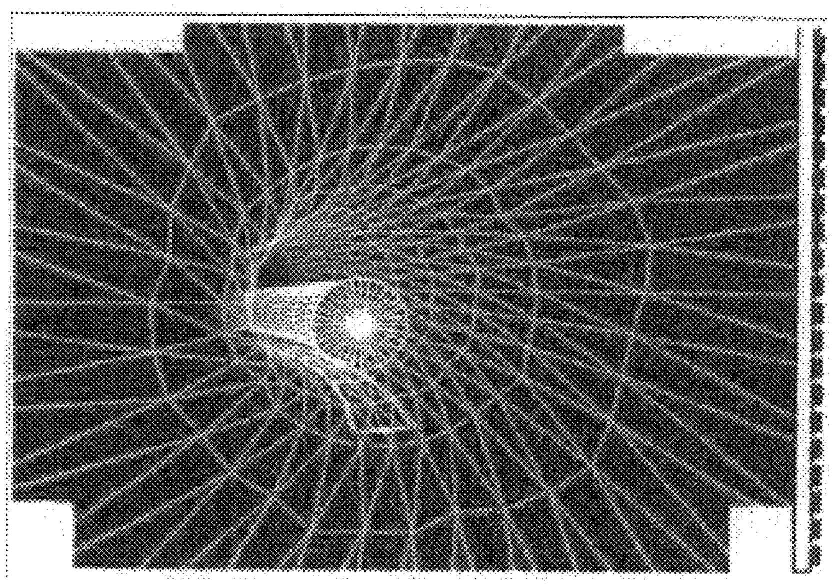
FIG. 3*a* is a rendering of a wire-mesh skeleton for an internal view of a wellbore and drill string generated by a system in accordance with one embodiment of the invention.
Figure 3B:
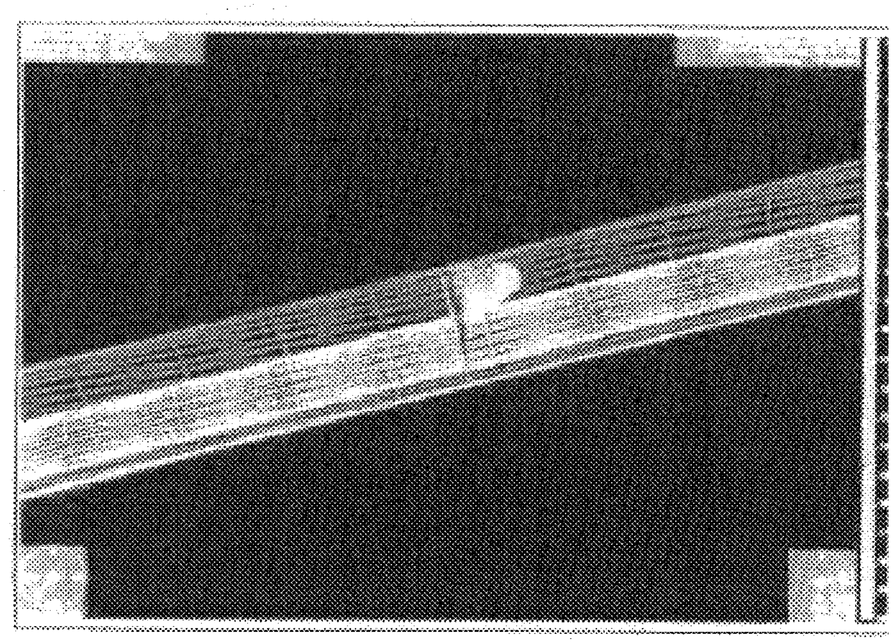
FIG. 3*b* is a rendering of a wire-mesh skeleton for a side-projection view of a wellbore and drill string generated by a system in accordance with one embodiment of the invention.

The collection of mesh skeletons can be displayed as an internal borehole view as shown in FIG. 3*a* and as a side projection as shown in FIG. 3*b*. The lack of uniformity in the borehole view illustrates how rugosity can be introduced in the images. Next, the meshes preferably have suitable textures mapped thereon, as represented by block 56 in FIG. 2. Those of ordinary skill in the art will appreciate that in basic texture mapping, an image is applied to each polygon (triangle) in a mesh by assigning texture coordinates to the polygon's vertices. These coordinates index the texture image, and are interpolated across the polygon to determine, at each of the polygon's pixels, a texture image value. The result is that some portion of the texture image is mapped onto the polygon when the polygon is viewed (rendered) on the screen.

Figure 9A:
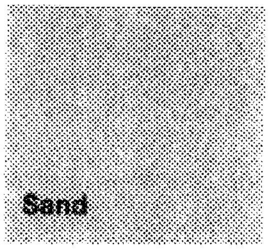
FIGS. 9*a* through 9*g* are texture maps of various formation materials applied to wire-mesh models of wellbores and drill strings in accordance with one embodiment of the invention.
Figure 9B:
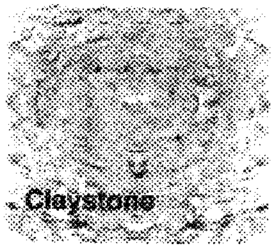
Figure 9C:
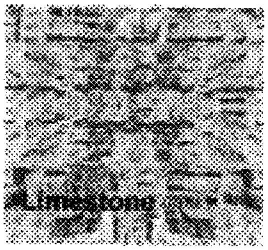
Figure 9D:
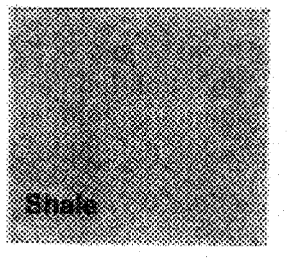
Figure 9E:
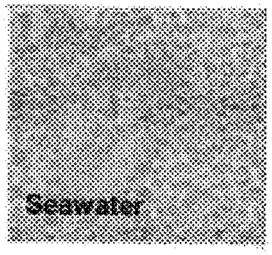
Figure 9F:
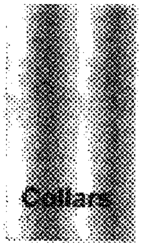
Figure 9G:

Some exemplary textures are shown in FIGS. 9*a* through 9*g*. In particular, a sand texture is shown in FIG. 9*a*, a claystone texture is shown in FIG. 9*b*, a limestone texture is shown in FIG. 9*c*, a shale texture is shown in FIG. 9*d*, and a seawater texture is shown in FIG. 9*e*. FIG. 9*f* shows a drill collar image that can be mapped to the virtual drill string at the location of each drill collar. Similarly, FIG. 9*g* shows a drill bit image that can be mapped to the virtual drill string at the location of the drill bit. A variety of other textures to represent both wellbore and drill string components may also be used, as would occur to one of ordinary skill in the art.

In one embodiment, the rock and formation textures (FIGS. 9*a* through 9*e*) may be created from photographs of actual materials. Each is transformed into a "seamless" graphic using the Möbius-strip concept for continuity and effect. That is, the top edge of each texture map matches seamlessly with its bottom edge, as does the left edge with the right edge. In this way, when the texture mapping is performed on the wire mesh models, the result is a seamless rendering of the drill string and borehole. The drill bit (FIG. 9*g*) is its own mesh created using a simple 3D solids modeling program.

It should be appreciated that the meshes can be manipulated and adjusted to show common, if not problematic, borehole behavior. For example, the meshes and textures may be used to visually show washouts, breakouts, rugosity, keyseats, constrictions due to formation swelling, stuck tools, wellbore "junk" or "fishes", the influx of formation water, formations involved in a blowout, as well as other conditions and environments that can occur in, around and near the wellbore.

Figure 4A:
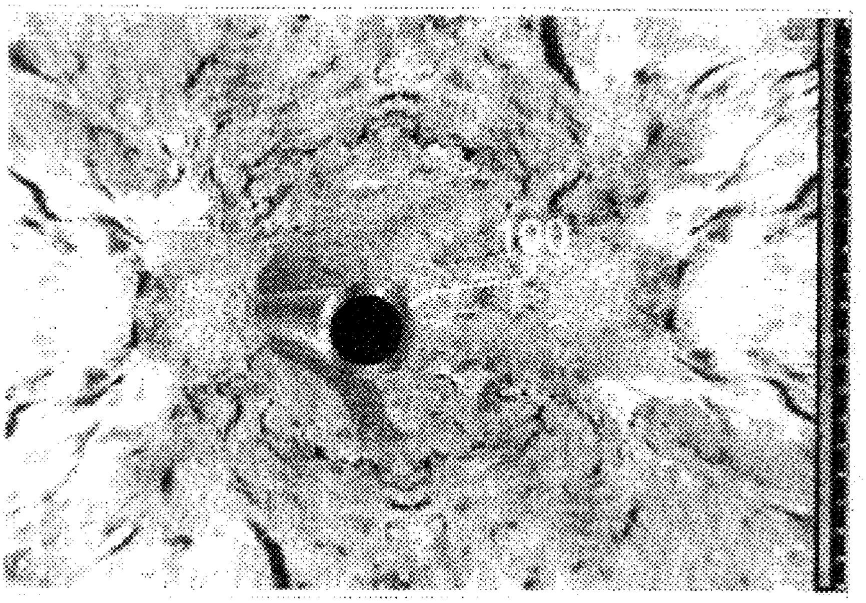
FIG. 4*a* is a rendering of an internal view of a wellbore and drill string after texture mapping of a wire-mesh skeleton modeling of the same.
Figure 4B:
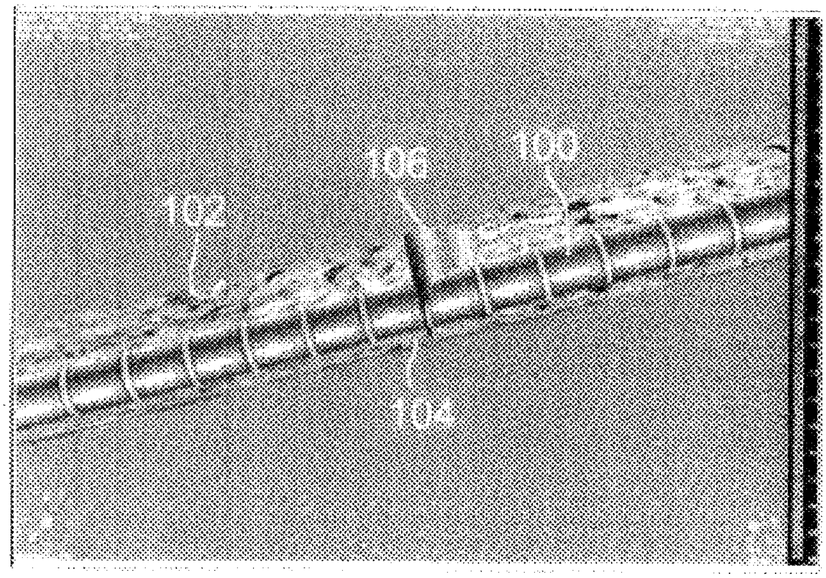
FIG. 4*b* is a rendering of a side-projection view of a wellbore and drill string after texture-mapping of a wire-mesh skeleton of the same and including a velocity profile at a selected location in the wellbore.

Having fully defined the virtual wellbore as an ordered sequence of texture-mapped meshes, each having specified depth-varying parameter values associated therewith, the wellbore environment can now be displayed (rendered) on a suitable monitor or display screen. This is represented by block 58 in FIG. 2. FIGS. 4*a* and 4*b* are examples of renderings of the wellbore in the exemplary embodiment. For reference, the images in FIGS. 3*a*, 3*b*, 4*a*, and 4*b* were created from the data presented in FIG. 1 at 14,680-ft measured depth, 7,830-ft true vertical depth (TVD), and 75° inclination.

Each mesh may have associated therewith data points for the borehole, cuttings bed, drill string, and bottomhole assembly. The vertices can be adjusted and even rotated, but are static and cannot be translated up and down the well path. On the other hand, a dynamic mesh is provided for a velocity profile, so that the 3D velocity profile can be continually reconstructed as the virtual camera navigates the wellbore path under user control, as represented by block 60 in FIG. 2 and as is hereinafter described in greater detail. As an illustration of this, refer to FIGS. 3*b* and 4*b*, wherein a velocity profile designated with reference numeral 106 is shown.

Every mesh also has associated material RGB (red-green-blue) components that allow highlighting for special effects. Additional components, including diffuse (scatter), ambient (common), specular (shiny), and emissive (glow), determine how materials respond to a light source. One use of these properties is to effectively place a translucent filter over any texture, permitting appropriate borehole textures to be highlighted with different colors to represent numerical parameters that otherwise would be difficult to represent.

In addition or as an alternative to wire frame mesh based modeling, other computer modeling and visualization techniques may be employed. As an example, rendering techniques based on voxels may be employed. A voxel (i.e., volumetric pixel) is a volume element, representing a value in 3D space, which is analogous to a pixel, representing two-dimensional (2D) image data. Voxels can contain multiple scalar values, in what essentially is a vector data. In the wellbore visualization context, the value or values of a voxel may represent various properties that correspond to various parameters discussed above, including rheological properties, temperature, pressure, density, eccentricity, inclination, azimuth, geometry, velocity profile, cuttings bed depth, formation lithology, etc. Other values may be useful for immediate 3D rendering, such as a surface normal vector and color.

A volume containing voxels can be visualised either by direct volume rendering, described in greater detail below, or by the extraction of polygon iso-surfaces that follow the contours of given threshold values, after which visualization would proceed generally according to the technique described above. As known to those skilled in the art of computer graphics, the marching cubes algorithm is often used for iso-surface extraction; however, other methods exist as well.

Volume rendering is a technique used to display a 2D projection of a 3D discretely sampled data set. To render a 2D projection of the 3D data set, one first needs to define a camera in space relative to the volume. Also, one needs to define the opacity and color of every voxel. This is usually defined using an RGBA (red, green, blue, and alpha, i.e., transparency) transfer function that defines the RGBA value for every possible voxel value. Once converted to an RGBA value, the composed RGBA result is projected on correspondent pixel of a frame buffer. Direct volume rendering is a computationally intensive task that may be performed in a several ways.

Rendering techniques include volume ray casting, splatting, shear warping, texture mapping, all of which may be hardware accelerated and/or optimized in other ways. These and other techniques are known to those of ordinary skill in the computer graphics arts, and, as such, their details are not reproduced here. Additionally, these and other techniques may be combined in various ways to optimize the algorithms for the data being processed and/or the equipment being used, as would be understood by those of ordinary skill in the computer graphics arts.

Figure 10:
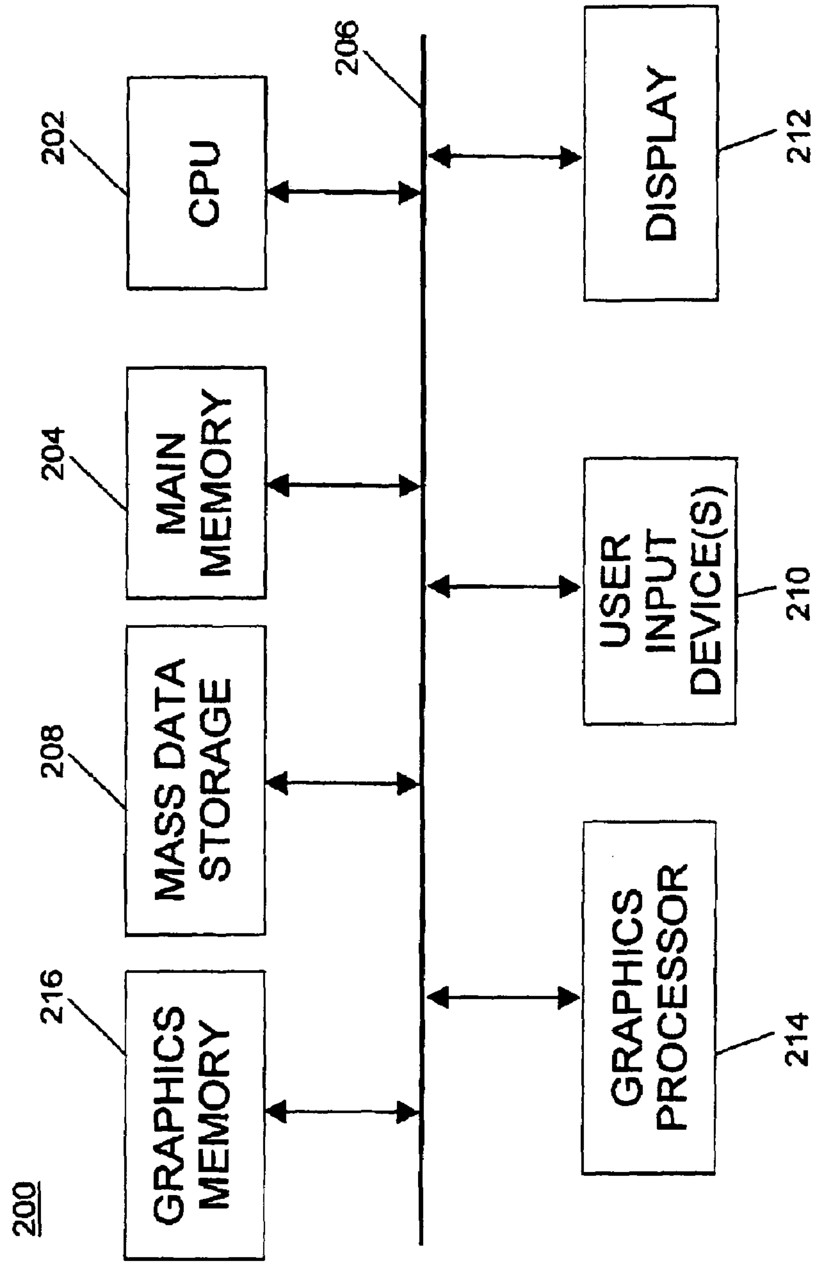
FIG. 10 is a block diagram of a computer system implementing a visualization system in accordance with one embodiment of the invention.

In the preferred embodiment, the interactive visualization system runs on a standard Microsoft® Windows®-based, standard-issue computers. This enables immediate review of the visualization results in 3D graphics, and makes the visualization application more accessible in other settings. FIG. 10 is a simplified block diagram of a computer system 200 suitable for the purposes of practicing the present invention. In accordance with conventional computer architectures, computer system 200 comprises a central processing unit (CPU) 202. In a preferred embodiment, CPU 202 is a conventional personal computer processing unit such as an Intel® Pentium®-class processor operating at a clock speed on the order of two to four gigahertz or so, although with the advance of the art, increased CPU speed is highly desirable.

Further in accordance with conventional computer architectures, CPU 202 is coupled to main memory 204 via a system bus 206. Main memory preferably has a capacity on the order of at least 500 megabytes or so, although with the advance of the art increased memory amounts of 4 gigabytes or so and more are desirable. A mass data storage unit 208, such as a conventional hard disk drive is also accessible by CPU. In one embodiment, data storage unit 208 initially stores the well data shown in FIG. 1. One or more user input devices, represented by block 210, are also necessary, as would be apparent to those of ordinary skill in the art. Among the useful user input devices that may be provided are a keyboard, a mouse or other cursor control device, and perhaps others, such as a joystick, game pad, or the like, as will be hereinafter described.

Optionally, a graphics accelerator card 214 (common in most state of the art personal computers) may be provided to ensure efficient operation of the visualization system. Providing graphics processor 214 lessens the processing burden placed on main CPU 202, as would be recognized by those of ordinary skill in the art. Further, graphics processor 214 may have some amount of graphics memory associated therewith, thereby freeing up more memory capacity in main memory 204. Finally, of course, a graphics display device 212, such as a cathode ray tube (CRT), liquid crystal display (LCD), or the like, is necessary to present the visualization renderings to the user.

Microsoft® DirectX® 9.0 is suitable as a graphics engine to develop the visualization system code, although Direct3D® 10, the evolution of DirectX®, which is becoming available in prototype (beta) form, may prove even more suitable. Additionally, OpenGL® is a comparable, and competing, API for 2D and 3D graphics, which is available for Windows®-based computers, but is in more common use with non Microsoft Windows®-based computers, such as Apple® Macintosh® computers and various UNIX based workstations.

DirectX® is a multimedia and gaming software development kit for Windows® that takes advantage of using Win32 API, such as multi-threading support, a TCP/IP stack, and numerous user interface features. This basic graphics engine is sufficient for generating the high frame rates needed for smooth, lag-free operation. "Smart" rendering, for example, is one of the techniques used to maintain high frame rates during zoom operations by continuously optimizing the number of cells to display based on the camera viewpoint. For typical wells, and using current computer systems, the up-and-down navigation rate is in the order of 6-8,000 ft/min. Also, code optimization for speed minimizes processor requirements for graphics, leaving considerable time for intermediate engineering calculations, i.e., running the simulations or obtaining real-time data, etc.

In a preferred embodiment, graphics for the drilling visualization application are rendered based on the position, orientation, and viewpoint of a "virtual camera" that is navigated along and around the wellbore and drill string by the user through manipulation of user input device(s) 210. As used herein, the term "navigate" is intended to refer to the process whereby the user, using user input device 210 such as a keyboard, mouse, joystick, game pad, etc. controls a location along the length of the borehole at which the data illustrated in FIG. 1 are used to generate a visual depiction of the borehole and drill string. Navigation further entails controlling the orientation of the virtual camera relative to the borehole and drill string.

As noted, various user input devices 210 are available to permit the user to change the camera attributes and navigate through and around the well path. One option is a computer keyboard, but the ubiquitous joysticks and game pads used for consumer games are preferable. Additionally, various commercially-available haptic interfaces, which permit user control in a three-dimensional virtual space may be used. Haptic interfaces have the added advantage of being capable of providing tactile and other sensory feedback to the user, thereby enhancing the ability of the system to communicate information about the modeled wellbore and drill string based on the available data, which may be otherwise difficult to present to the user.

Conventional action mapping is used to automatically or manually interface different input devices to the software. In one embodiment, the set of actions includes camera movements down and up the hole, side-to-side (rotation), zoom, and internal and side projections. The internal projection simulates camera movements like the downhole video example discussed previously. Side projections can combine navigation along the well path, zoom (in and out), and 360° rotation for maximum ability to critically examine the simulated downhole environment.

Figure 5A:
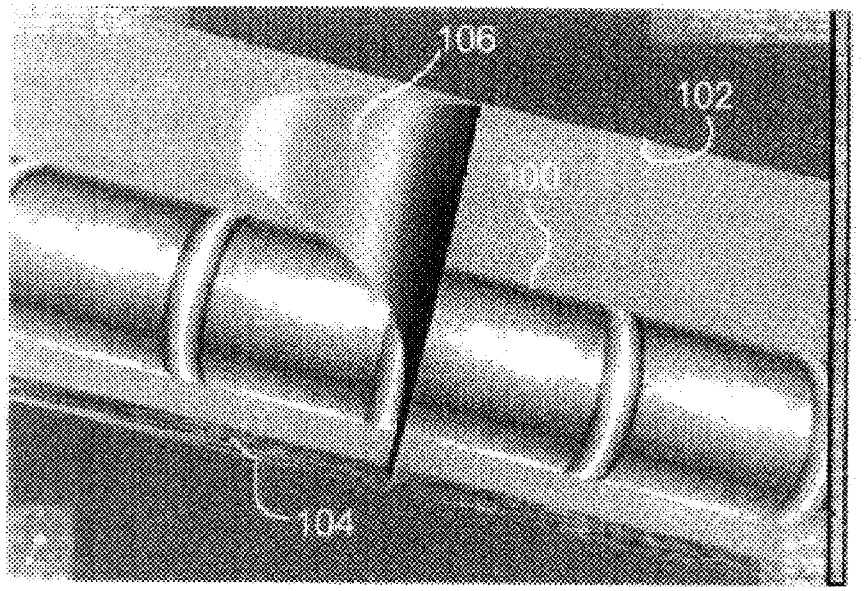
FIGS. 5*a*, 5*b*, and 5*c* are other renderings of side-projection views of a wellbore and drill string after texture-mapping of a wire-mesh skeleton of the same and including a velocity profile at a selected location in the wellbore.
Figure 5B:
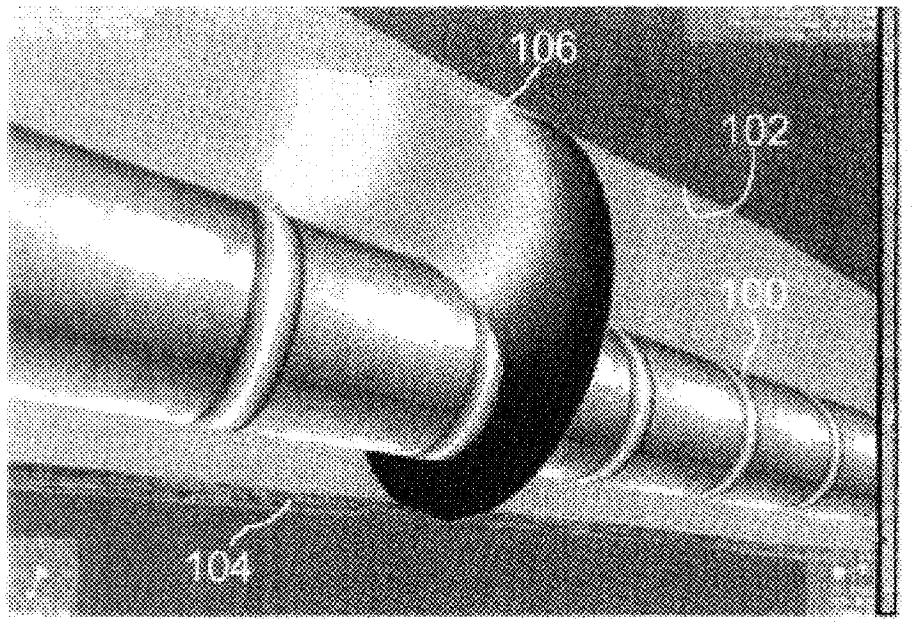
Figure 5C:
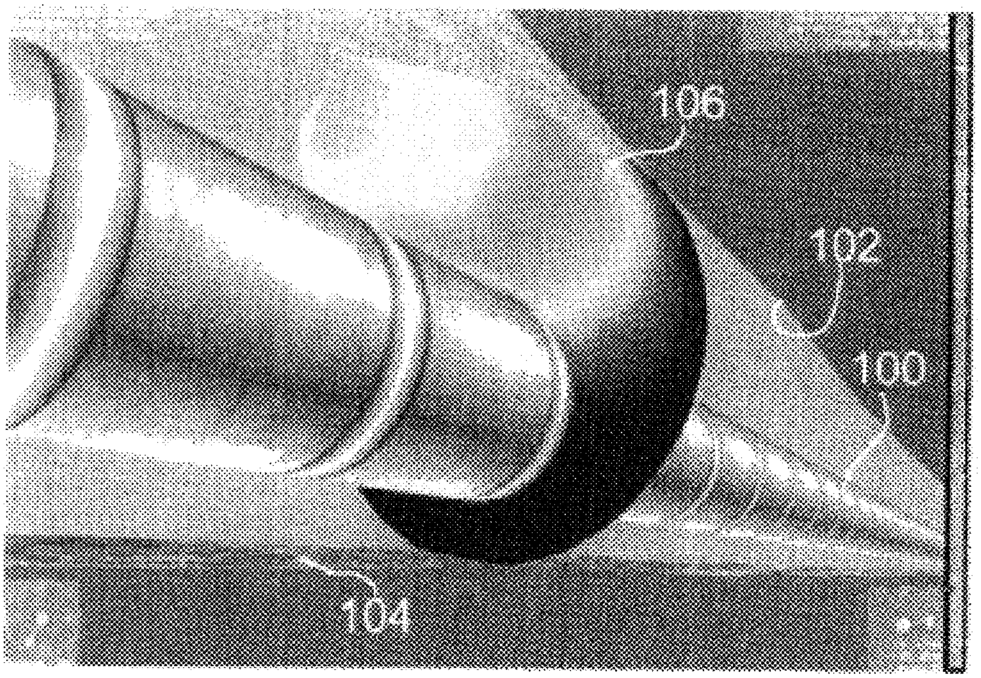
Figure 5D:
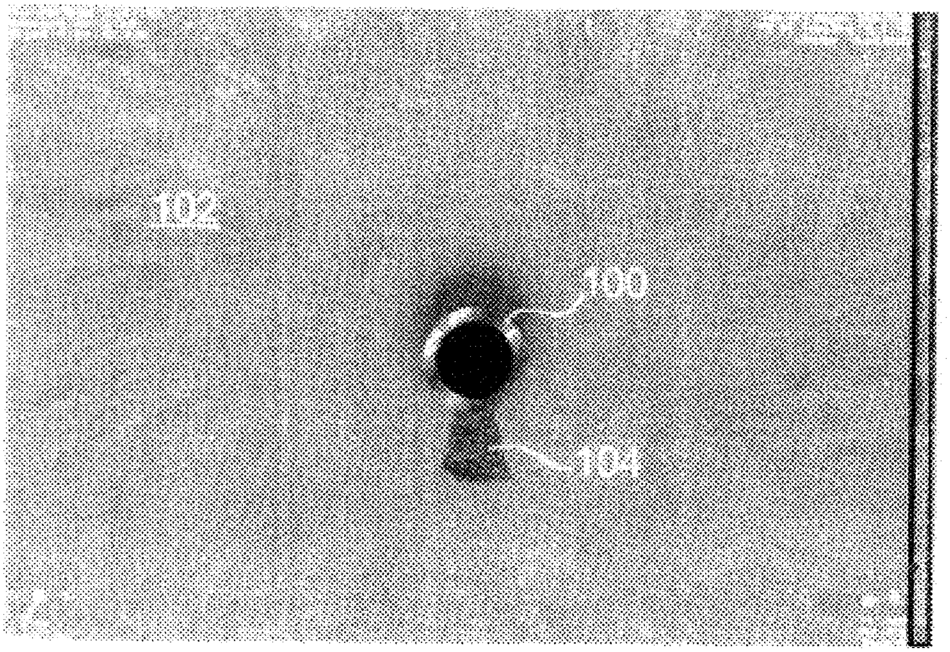
FIG. 5*d* is a rendering of an internal view of a wellbore and drill string after texture-mapping of a wire-mesh skeleton of the same and including a cuttings bed in said wellbore.
Figure 6A:
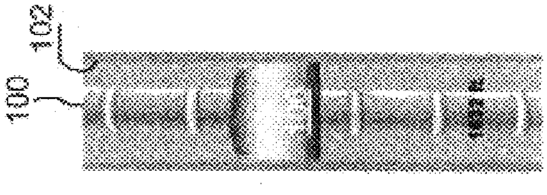
FIGS. 6*a* through 6*f* are renderings of side-projection views of a wellbore and drill string at a sequence of well depths showing variations in a velocity profile resulting from drill string eccentricity.
Figure 6B:
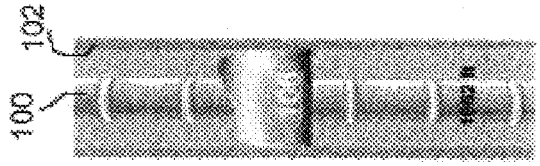
Figure 6C:
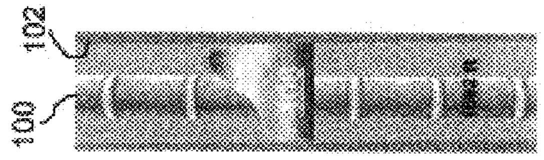
Figure 6D:
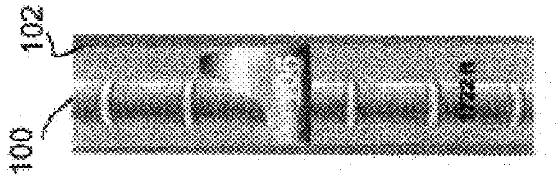
Figure 6E:
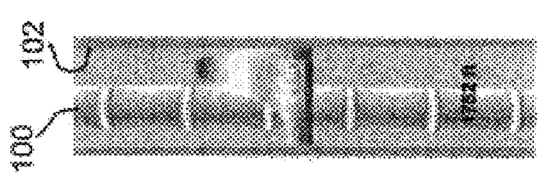
Figure 6F:
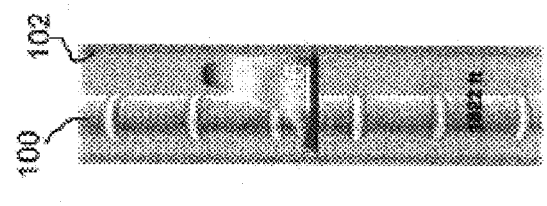

Virtual camera zoom and rotation features are illustrated in FIGS. 5*a* through 5*b*, which show the example well at 17,580-ft measured depth, 8,516-ft TVD, and 76° angle. FIGS. 5*a*, 5*b*, and 5*c* are external views of the borehole and drill string. In FIGS. 5*a* through 5*d*, the drill string is designated with reference numeral 100 and the edge of the borehole is designated with reference numeral 102. FIG. 5*d* is an interior view of drill string 100.

As can be seen in FIGS. 5*a* through 5*d*, the virtual camera can be zoomed, rotated, and reoriented with respect to drill string 100. Also, a cuttings bed 104 is observable in FIGS. 5*a* through 5*d*.

In accordance with one embodiment of the invention, the data shown in FIG. 1 are sufficient for the visualization system to provide a velocity profile providing a visual indication of the velocity of drilling fluid in the wellbore at any region to which the user has navigated the visualization. In FIGS. 5*a* through 5*c*, such a velocity profile is designated with reference numeral 106. In the presently disclosed embodiment, velocity profile 106 is somewhat analogous to a virtual flexible membrane surrounding the drill string. Depending upon the modeled velocity of the drilling fluid, this virtual membrane is deformed, much like a balloon, such that points of higher velocity cause greater deformation in the topology of the virtual membrane. Thus, higher peaks in the topology of the velocity profile correspond to higher velocity fluid flow. Furthermore, a spectrum of colors can be defined to a range of velocities, such that the user is provided with even further visual feedback as to the fluid velocity around the drill string.

Navigation permits visual analysis of the entire data set. For example, the sequence of images in FIGS. 6*a* through 6*f* illustrates the effects of changing eccentricity on the calculated velocity profile 106. It can be seen in FIGS. 6*a* through 6*f* that in the section of borehole 102 ranging from 1,632 feet (FIG. 6*a*) to 1,822 (FIG. 6*f*), the drill string 100 gradually moves from concentric to highly eccentric on one side of the borehole. It can further be observed from FIGS. 6*a* through 6*f* that the visual indication of velocity profile 106 changes to reflect the changing fluid dynamics resulting from this increasing eccentricity. Color coding associated with the velocity profile also can be used to visually indicate different flow regimes that can occur in the annular cross section.

Figure 7:
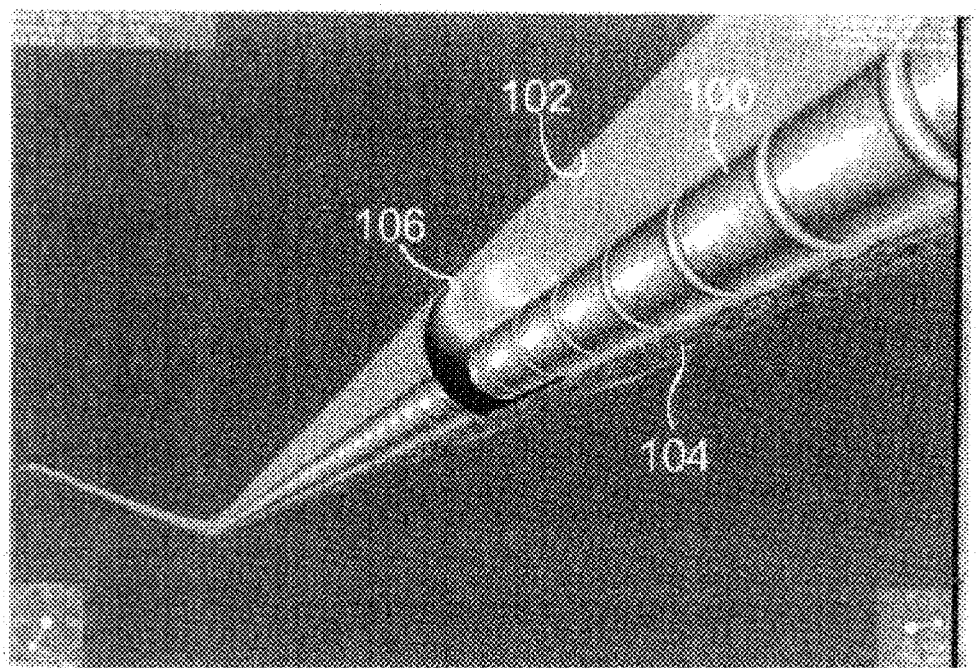
FIG. 7 is a rendering of a perspective view of a wellbore and drill string, including a velocity profile and a cuttings bed.

FIG. 7 is a visualization of the well data at 17,280 ft after reducing the modeled flow rate to 500 gal/min. The cuttings bed 104 is the result of the inclination, pipe eccentricity, penetration rate, mud properties, skewed velocity profiles, and inadequate flow rate.

Figure 8:
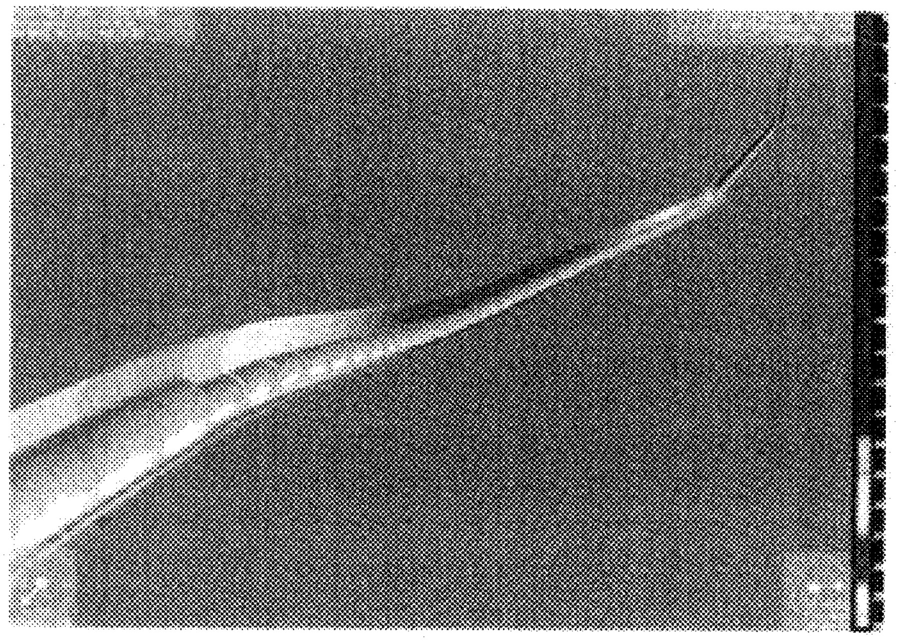
FIG. 8 is a rendering of a perspective view of a wellbore and drill string with a spectral indication of wellbore temperature varying with depth.

Preferably, the data structure on which the visualization system of the present invention is based is such that any numerical value in the cell records can be displayed and represented in the 3D visualization graphics. However, some parameters are easier to represent than others. A color-coding system is a common option used in graphics for analog display of numerical data, especially those difficult to represent. Downhole density, equivalent static density (ESD), equivalent circulating density (ECD), and temperature are examples. Material RGB components and texture highlighting described above are used in FIG. 8 to show the annular fluid temperature profile for the sample well. As shown in FIG. 8, instead of texture mapping the sample formation textures from FIGS. 9*a* through 9*e* on the mesh corresponding to the borehole sidewall 102, colors corresponding to the temperature data (element 20 in FIG. 1) are shown, providing the user with a visual indication of the temperature gradients along the length of the borehole. The user can then note, for example, that in the example of FIG. 8, the maximum annular temperature occurs off bottom at about 18,000 ft.

Texture highlighting can also be used to focus attention on cells that indicate potential or existing problems. A cuttings bed height above a preset level is a simple example. User adjustable rules can be used to direct the software to automatically seek out problem sections and display key aspects using a predefined sequence. Additionally, audio alarms or spoken audio (created using voice generation techniques) may be used to communicate such information to the user. For example, the software may be programmed to alert the user that "The cuttings bed exceeds X centimeters at a depth of Y feet into the borehole."

While the foregoing examples focused primarily on the visualization of measured and/or simulated steady state data, i.e., data that are not changing with time, the visualization system may also incorporate time varying data into the visualizations. Such time varying data may include transient data, which is effectively a recording of the evolution of one or more well parameters over time. Such a recording may be of events that have already happened or a simulation of events testing a particular change that is contemplated for the well. As with the steady state examples discussed above, transient data may include simulated data, measured data, or any combination of the two. In addition to transient data, the visualization system may also incorporate real-time data, i.e., measured data and or simulated data based on measured data from the well in real time.

Figure 13:
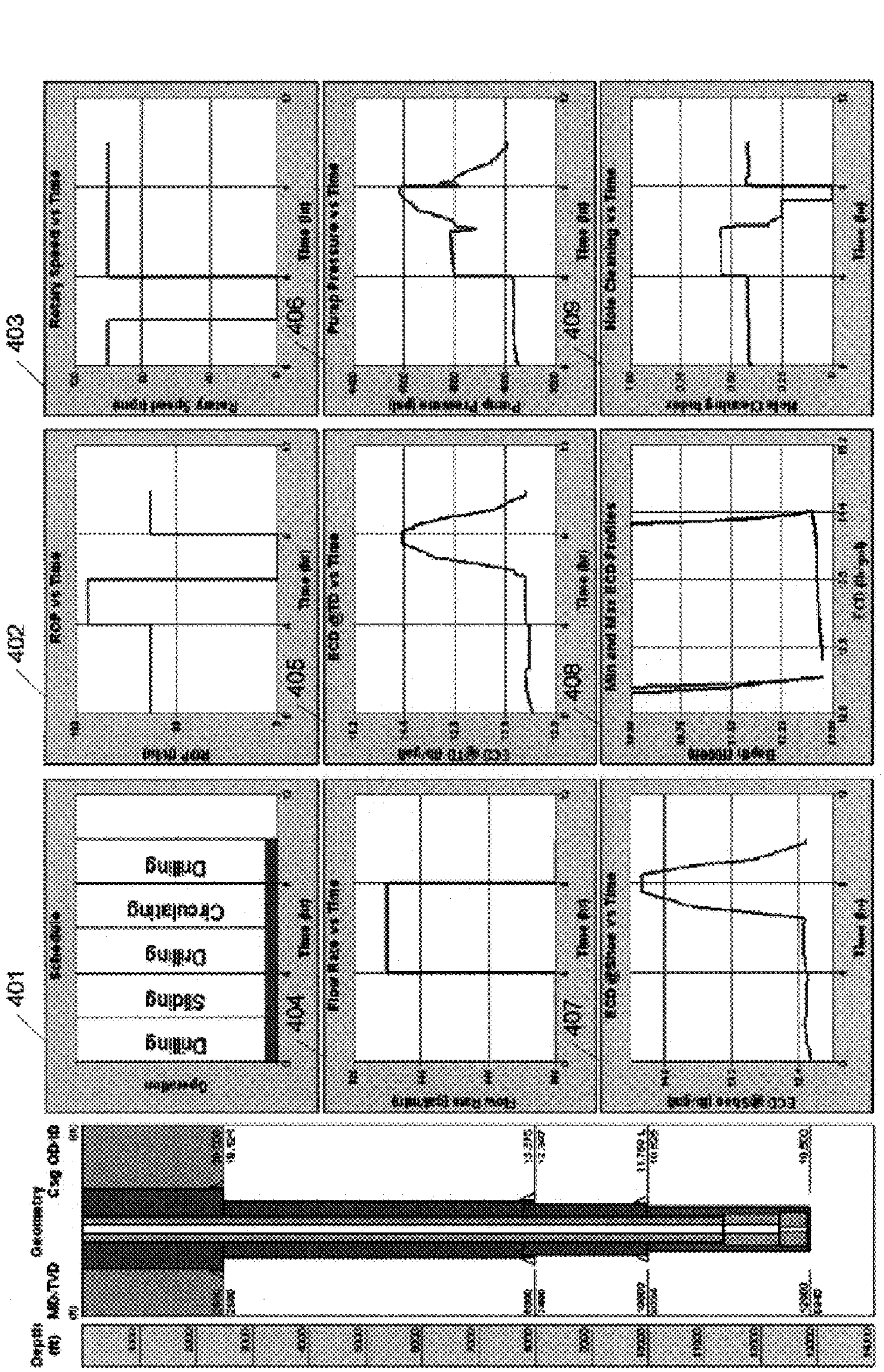
FIG. 13 illustrates several plots of well data that vary as a function of time.

An example of a transient data set that may advantageously be visualized in accordance with the visualization system described herein is illustrated in FIG. 13. This data set is the transient analog of the well data illustrated in FIG. 1, and illustrates how different options can be evaluated from a file stream of data for varied drilling, tripping, and multiple fluid displacement scenarios. The various graphs depict the amount of time spent on drilling sliding, and circulating operations 401, the rate of progress as a function of time 402, rotary speed as a function of time 403, drilling fluid flow rate as a function of time 404, equivalent circulating density at total depth as a function of time, pump pressure as a function of time 406, equivalent circulating density at the shoe as a function of time 407, and hole cleaning efficiency as a function of time 409. Also depicted are profiles which depict minimum and maximum equivalent circulating densities (ECD) as functions of depth.

As a general principle, transient visualizations are accomplished in substantially the same manner as described above. The principal difference is the addition of a time dimension to the arrays of input data processed by the engineering modeling module(s) 302 and the corresponding time dimension to the arrays of output data processed and rendered by the 3D graphics engine(s) 304. Thus, spatial rendering will proceed generally as outlined above, but a spatial rendering will exist for each moment in time throughout the transient event(s). In addition to the spatial navigation features discussed above, interactive navigation module 305 will also need to provide temporal navigation controls for the user.

Therefore, in addition to the spatial controls discussed above, VCR-type controls linked to the file stream are particularly helpful. These VCR-type controls, include operations such as "play", which allows the transient visualization display to progress. "Rewind" allows a user to review the visualization backwards in time, at varying speeds, while, "fast forward" allows a user to accelerate through time at varying speeds. Finally, a "pause" allows a user to stop time and view a well region or regions at a particular instance in time during the transient.

Figure 14:
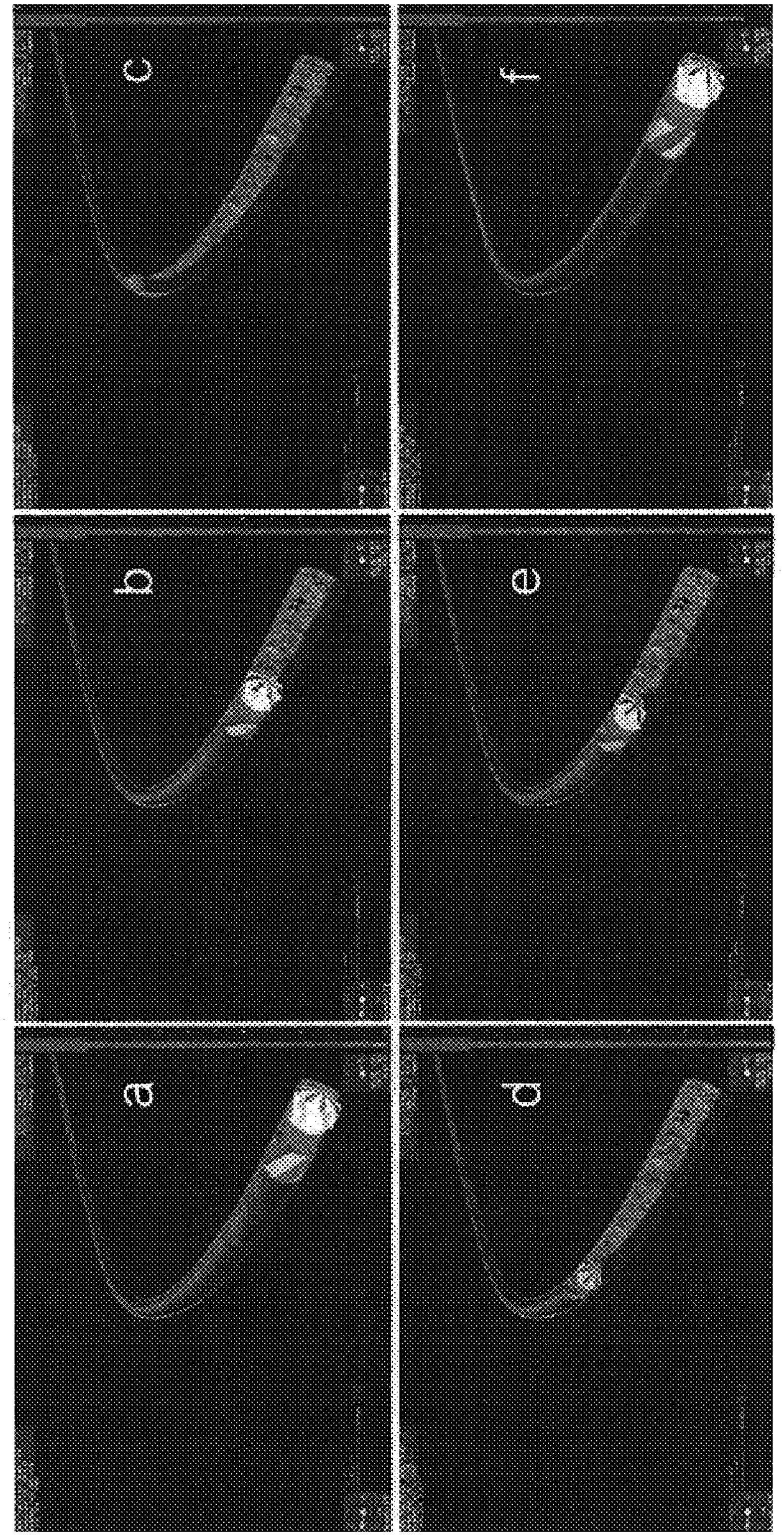
FIG. 14 is a sequence of frames rendering a transient short trip operation.

FIG. 14 is a screen capture that shows the drill string on its way out of the hole during a short trip operation. Six frames (a-f) are depicted. While the virtual camera is stationary during this sequence, in a location determined by the user using the spatial manipulation controls discussed above. Movement of the drill string up the wellbore (frames a-c) and back down (frames d-f) may be clearly seen as a function of time (progressing from frame a to frame f). Additionally, the cuttings piles ahead of the downward proceeding drill bit may be seen in frames d and e. The user may move through these frames (and the intermediate frames not shown for brevity) using the VCR-type controls discussed above.

As in a real well, important events occur simultaneously in different regions along the complete well path. The user must make decisions on which interval(s) to focus during a particular time interval. Therefore, another useful aid is the ability for the software to automatically seek and concentrate on problem areas interactively selected by the user. For example, the user may wish to closely examine all intervals in the well where the cuttings bed thickness is greater than a certain value. On command, the software can automatically and sequentially navigate to each of the intervals that exceed the specified thickness value.

To further facilitate transient visualizations, major object collections are preferably decoupled and manipulated independently, both by the engineering modeling module(s) 302 and by the 3D graphics module(s) 304. Examples of such object collections include the drill string, the bit, the cuttings bed, the wellbore, etc. This decoupling facilitates the number of engineering calculations that are needed for interpolation, to fill in gaps in discrete data sets and to handle dynamic objects, such as cuttings beds, which result from the fact that the drill string is not always at the bottom of the wellbore.

Additional aspects of real-time visualization will now be described. Real-time visualization has facilitated by the development of well site ECD management systems that can provide in hydraulics profiles similar to those shown in FIG. 1 in real time. Although, as a general principle, the real-time and steady state visualization systems are functionally equivalent, the real-time version requires concurrent execution of all five basic wellbore visualization components illustrated in FIG. 11 and discussed above. The resulting high demands on computer time to synchronize and process continual interactions among the components become a major concern.

As such, real-time applications may be designed to handle graphics and interactive navigation on a different computer than the combined data input and engineering modeling, as was described above with respect to FIG. 12. For such an embodiment, it is believed that the bidirectional data interface between the computers is best handled by file streams. Distribution of responsibilities among different computers gives rise to other advantages in addition to computational load reduction. For example, the use of multiple computers for graphics and interactive navigation is a definite advantage if several critical events worthy of visualization by different personnel occur simultaneously in different intervals of the well.

As in the case of drilling operations, hydraulics and other fluids related processes are also important to downhole completion and workover operations. Because the core of the visualization system relates to visualization of hydraulic parameters that vary as a function of well depth and/or time, completion and workover operations may also be advantageously visualized using a system as described herein. Functional requirements for visualization of completion and/or workover operations are basically the same as for the drilling hydraulics case. However, engineering modeling requirements and technical focus are somewhat different. For maximum benefit, it clearly is important to design the visualization application to fit specific user needs as much as possible.

Examples of completion and workover operations that may beneficially be visualized using the system disclosed herein include displacement mechanics and wellbore cleaning, which are among those issues that are particularly suited for 3D wellbore visualization. Displacement from drilling mud to clear-brine completion fluid is a critical, initial step in the completion process. As is known to those skilled in the well-construction art, the objective of this dynamic operation is to provide a water-wet wellbore full of clean brine without the presence of any whole mud or mud film on tubular surfaces. This can be challenging if synthetic or oil-based fluids are involved.

Figure 15:
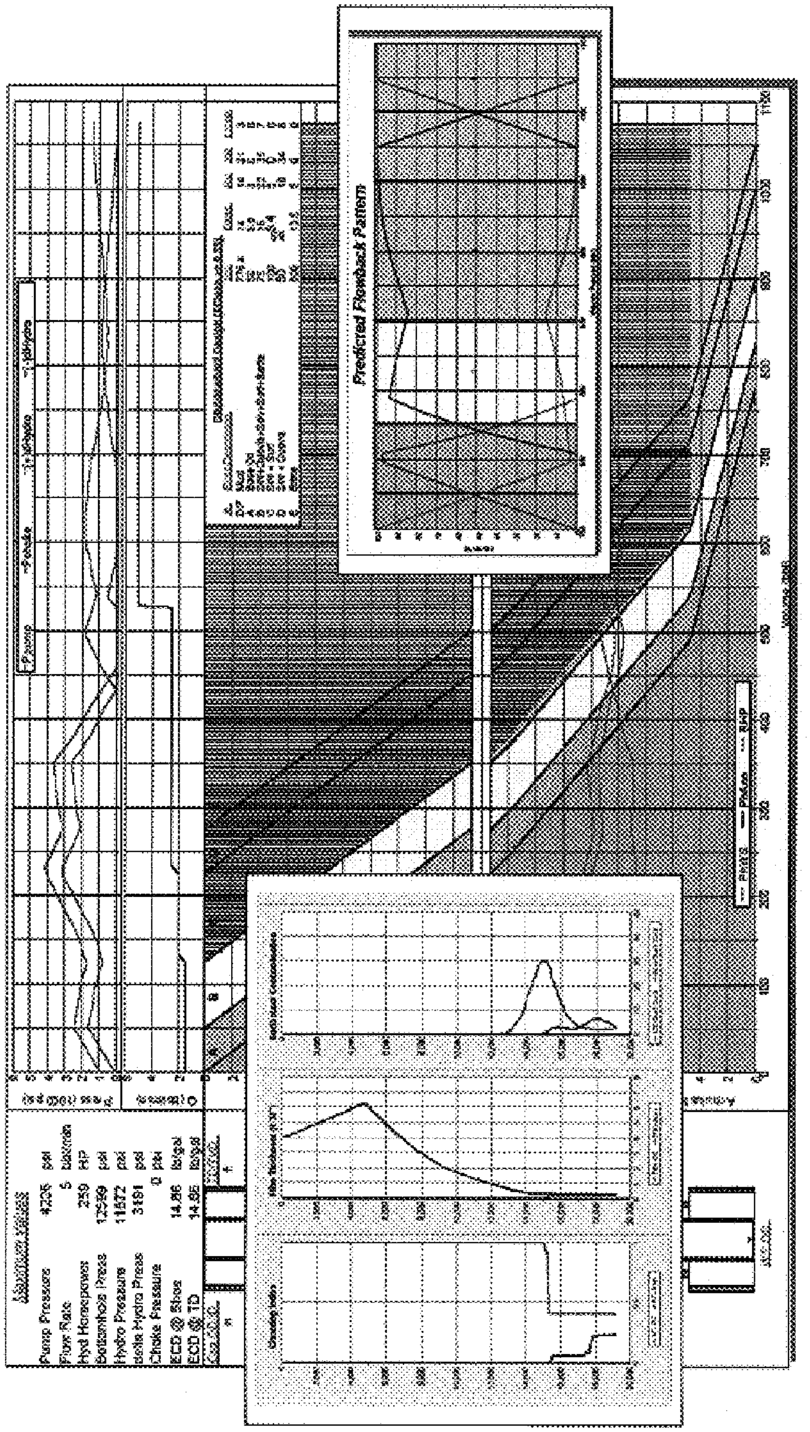
FIG. 15 illustrates an output of a computer modeling package for displacement operations.

Engineering software that targets key hydrodynamic and chemical factors has been developed to help design and manage this process, which may be used as the engineering modeling module 302 that provides output data to the 3D graphics module 304. Various parameters that may be advantageously visualized include pressures, volumes, flow rates, fluid-fluid interfaces, film thicknesses, cleaning efficiency, flow-back characteristics, etc. (see FIG. 15).

Figure 16:
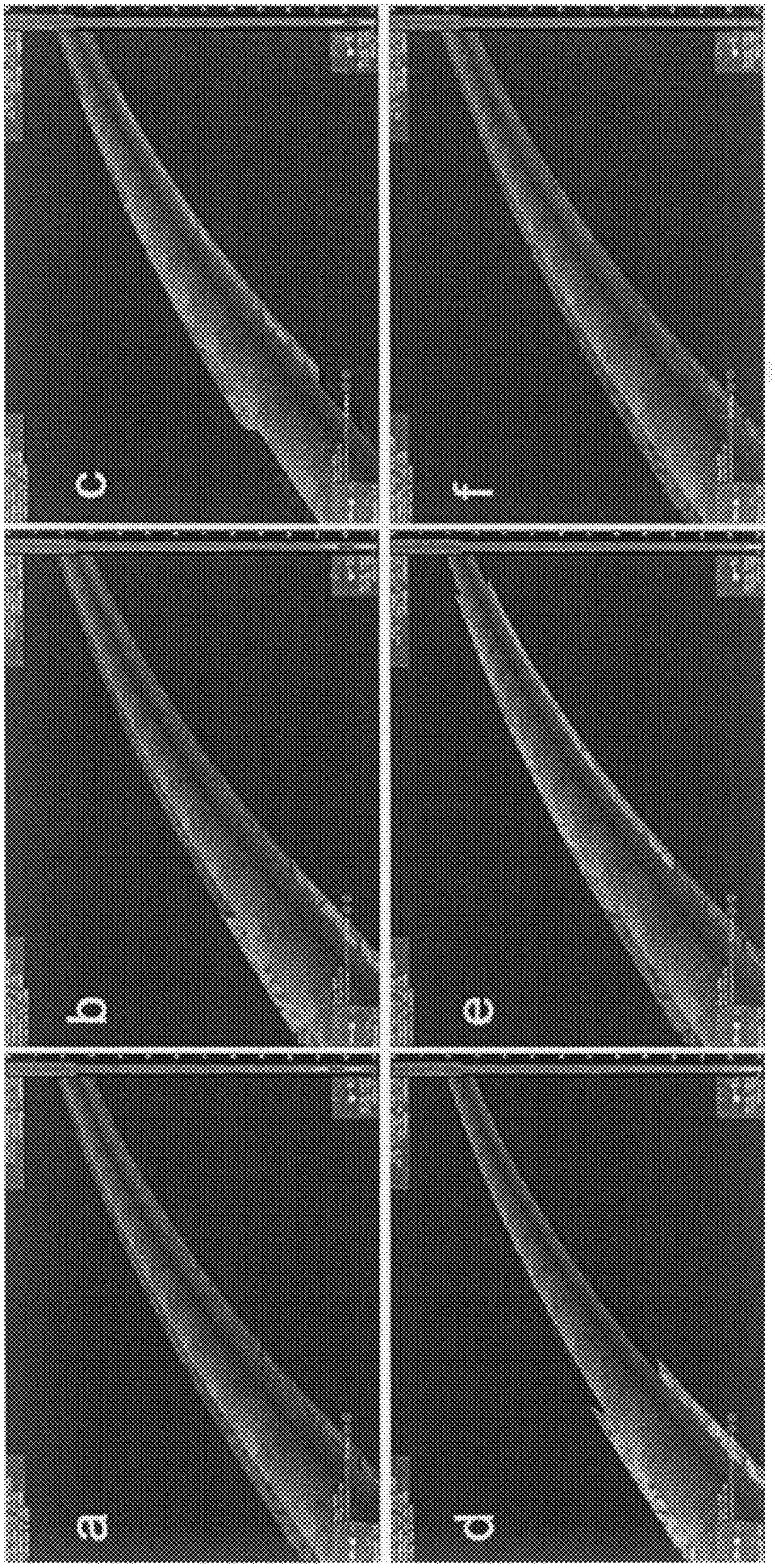
FIG. 16 is a sequence of frames rendering a real-time displacement operation.

In one aspect, the visualization focuses on the different fluids and the spacer train, tracking positions and interfaces as shown in the screen capture in FIG. 16. FIG. 16 comprises six frames (a-f) sequentially illustrating a displacement operation. Different fluids and the spacer are highlighted by different colors in this particular visualization. Another aspect of the visualization is concerned with mud film on tubulars. Interactive navigation, both spatially and temporally, is particularly helpful for monitoring this process. This is so because the transient models of this process are complex and conditions are continually changing along the well path. Special digital mixing and blending schemes for color highlighting used in both aspects may preferably be selectively activated by the user to enhance the visualization as demonstrated in FIG. 15.

The foregoing description and figures have disclosed a visualization system and method for effectively and efficiently presenting actual and/or simulated static, steady state, transient, and/or real-time well data to a user. The system permits interactive 3D visualization of the inside of a virtual wellbore to help critically examine downhole hydraulics and related conditions during drilling and during completion and workover operations. Mathematical models governing eccentricity, hole cleaning, velocity profiles, and other related engineering parameters can be validated using 3D visual results generated from the visualization of the data.

One of skill in the art will understand and appreciate that elements of the above specific embodiments may be optionally eliminated to enhance the visual understanding of the data. For example, it may be desirable to visually eliminate the drilling string or other aspects of the downhole environment to more closely examine a partially hidden feature. Further it should be appreciated that the above visualization method is not limited to time periods of active wellbore drilling. That is to say there are periods of inactivity (i.e., shut in) or non-drilling activity, tripping the drill string, running or cementing casing, hanging a liner, acid stimulation, fracturing, plugging, side tracking, and so forth that may also be visualized using the concepts of the present invention. For example, a trip of the drill string might be visualized so that the operators fully understand the potential consequences of tripping at excessive accelerations and velocities.

Optional auditory capabilities are available to enhance the value and usability of this system. One embodiment provides audio feedback through computer-generated speech to assist with the navigation process, to explain different events and relationships currently on display, and to alert the user of critical events that are not being displayed or are impending. Another embodiment includes rig and rig-operation sounds that are synchronized with the 3D simulations to add realism to and improve acceptance of the process. The system may also allow a user to navigate the virtual wellbore by voice command input using a microphone and suitable processing hardware and software.

Although specific embodiments and variations of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations that may have been suggested in the present disclosure, may be made to the disclosed embodiments without departing from the scope of the invention as defined by the appended claims. The foregoing description and drawings are, accordingly, to be regarded in an illustrative rather than a restrictive sense.

The invention claimed is:

1. A computer-based method of visualizing a wellbore, the method comprising:

receiving input well data comprising one or more data sets corresponding to one or more depth-varying and/or time-varying parameters of a well wherein at least one of the data sets corresponds to an interior of the wellbore;

modeling the wellbore based on the input well data, thereby producing modeled well data;

receiving a selection of a wellbore region; and displaying a visual rendering of a portion of the wellbore including the selected region, the visual rendering being based on at least one of the modeled well data and the input well data.

2. The method of claim 1 wherein the selection comprises at least one of a spatial selection and a temporal selection.

3. The method of claim 2 wherein the selection is manually entered by a user.

4. The method of claim 1 wherein the visual rendering comprises a texture-mapped wire mesh model of the wellbore.

5. The method of claim 1 wherein the visual rendering comprises a direct volume rendered model of the wellbore.

6. A visualization system for a wellbore environment, the visualization system comprising:

a source of one or more data sets corresponding to one or more depth-varying and/or time-varying parameters of a well wherein at least one of the data sets corresponds to an interior of the wellbore;

a graphics processor for creating a visual rendering of the wellbore environment based on the one or more data sets;

a user input device for allowing user selection of a region of the wellbore environment; and a graphics display for displaying at least a portion of the visual rendering determined by the user selection.

7. The visualization system of claim 6 wherein the one or more data sets comprise real-time well data.

8. The visualization system of claim 6 wherein the one or more data sets comprise modeled well data.

9. The visualization system of claim 6 wherein the source of the one or more data sets comprises one or more separate engineering computers.

10. The visualization system of claim 6 wherein the user input device allows for user navigation spatially along a visual rendering of said borehole.

11. The visualization system of claim 10 wherein said user input device allows for user selection of an orientation of said visual rendering.

12. The visualization system of claim 6 wherein the user input device allows for user navigation temporally through a visual rendering of said borehole.

13. The visualization system of claim 6 wherein the visual rendering comprises a texture-mapped wire mesh model of the wellbore environment.

14. The visualization system of claim 6 wherein the visual rendering comprises a direct volume rendered model of the wellbore environment.

15. The visualization system of claim 10 wherein the user input device is selected from the group consisting of: a keyboard, a mouse, a joystick, a microphone, and a game pad.

16. The visualization system of claim 12 wherein the user input device comprises VCR-type controls.

17. A computer-based method of visualizing a wellbore, the method comprising:

receiving well data comprising one or more data sets corresponding to a depth-varying and/or time-varying parameters of a well wherein at least one of the data sets corresponds to an interior of the wellbore;

receiving a selection of a wellbore region; and displaying a visual rendering of a segment of the wellbore including the selected region, wherein the visual rendering is generated from the well data.

18. The computer-based method of claim 17 wherein the well data comprises real-time data.

19. The computer-based method of claim 18 further comprising updating the visual rendering as additional real-time data are received.

20. The computer-based method of claim 19 further comprising:

receiving further user selections of a different region along the wellbore; and displaying a visual rendering of the user-selected different region.

* * * * *